Dec. 4, 1928.  1,694,226
A. McDOWALL
TRACTOR
Filed Dec. 31, 1923  5 Sheets-Sheet 1

Inventor.—
Andrew McDowall.
by his Attorneys.—

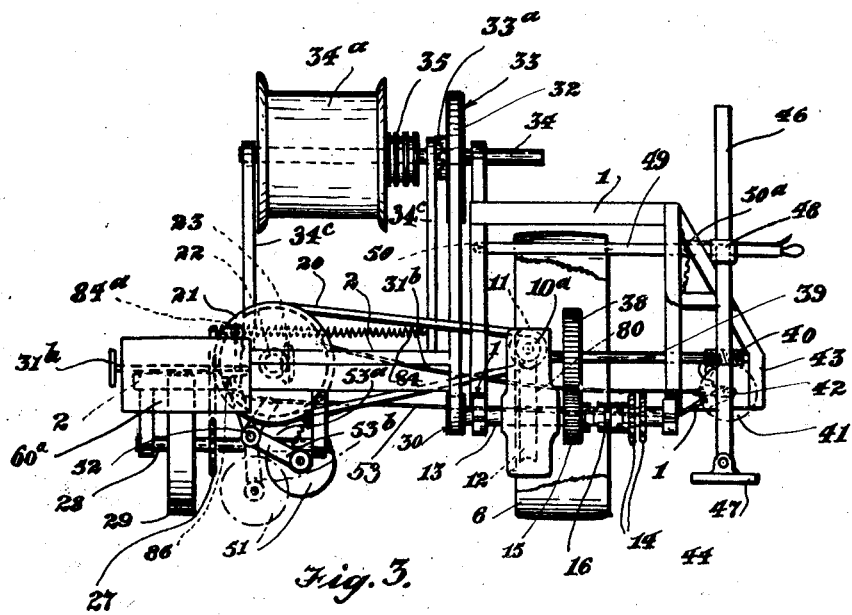
Fig. 3.
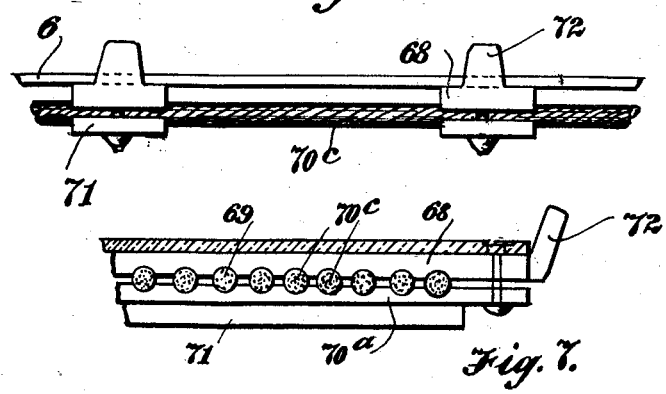
Fig. 6.
Fig. 7.
Inventor.
Andrew McDowall,
by his Attorneys.

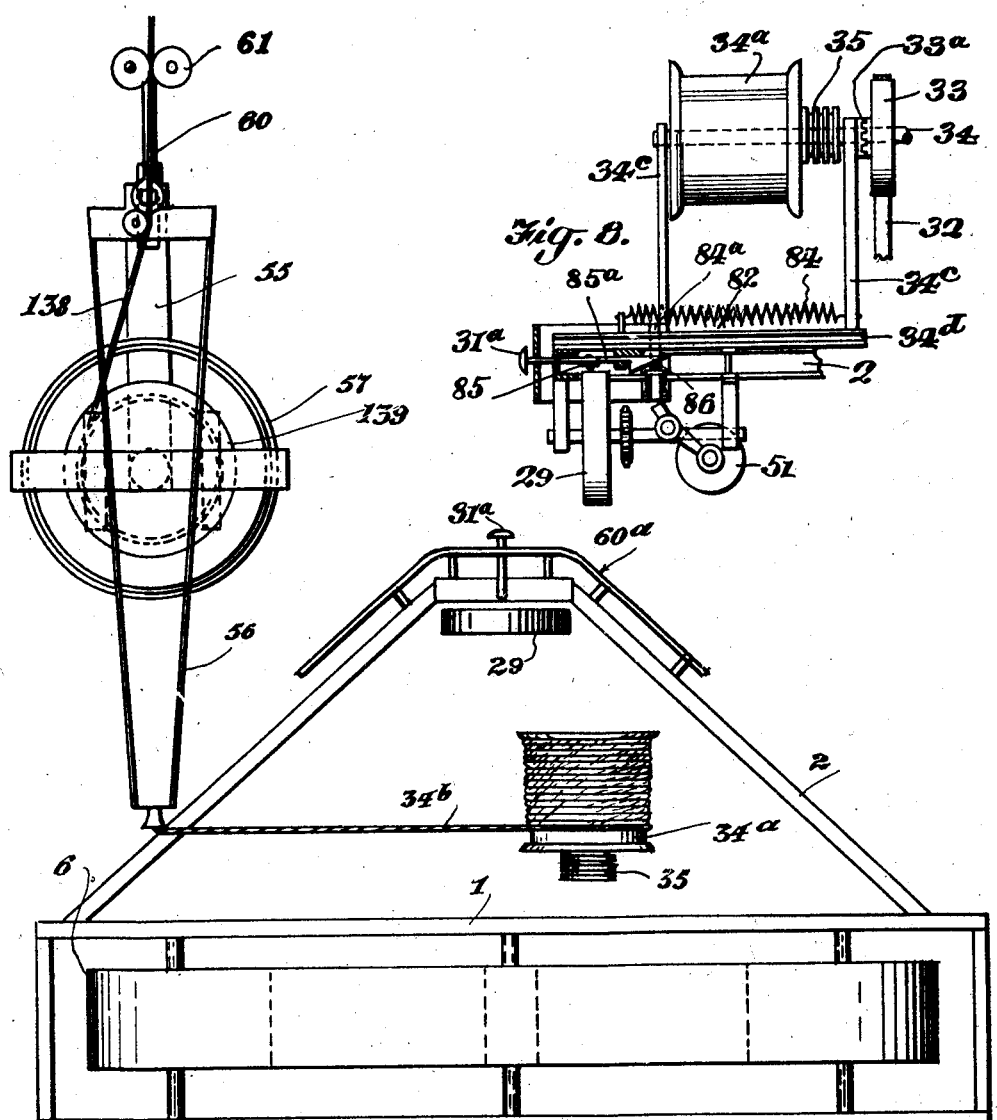

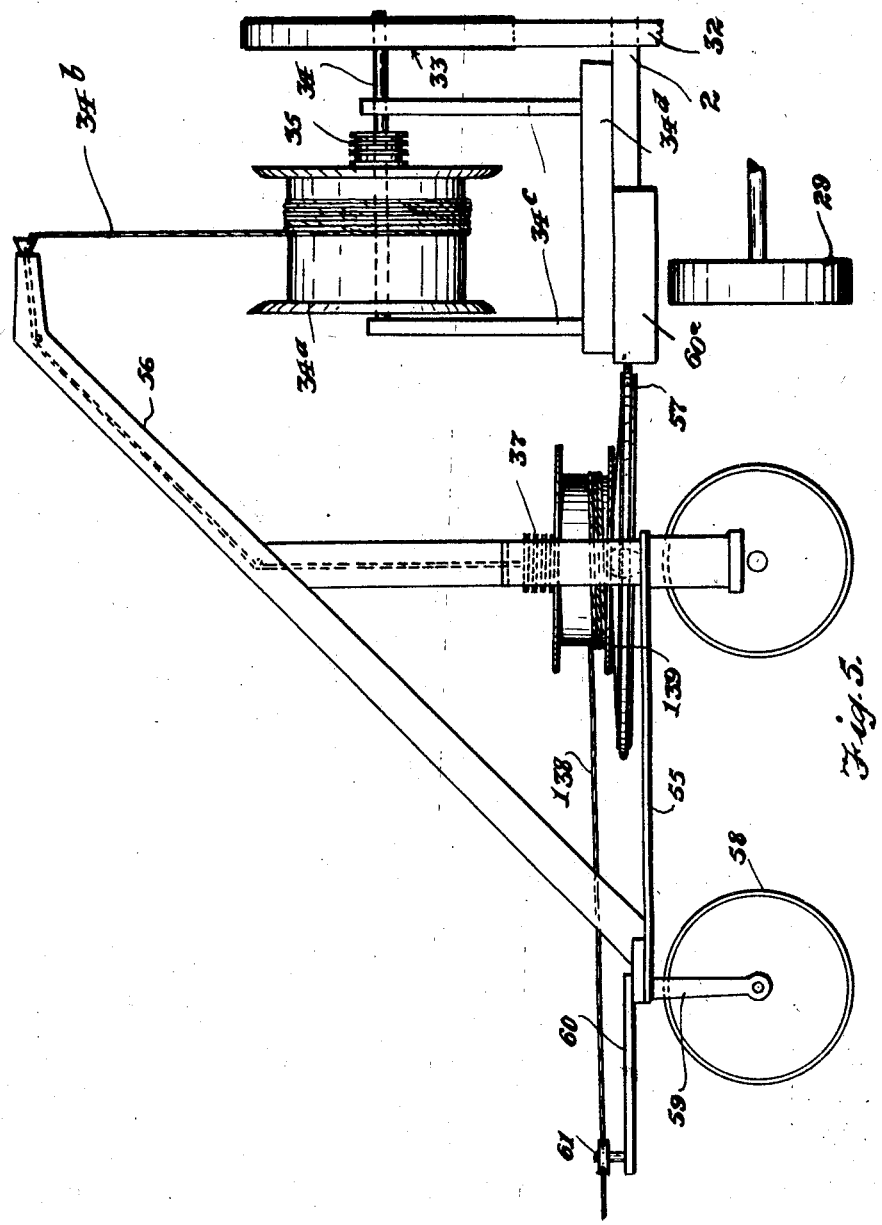

Patented Dec. 4, 1928.

1,694,226

UNITED STATES PATENT OFFICE.

ANDREW McDOWALL, OF CASTLE DOUGLAS, SCOTLAND.

TRACTOR.

Application filed December 31, 1923, Serial No. 683,807, and in Great Britain January 26, 1923.

This invention has reference to tractors and has for its object the construction of a tractor suitable for agricultural purposes adapted to be driven by an electric motor carried thereby and supplied by electrical energy from a stationary source.

My invention therefore has first for its object to provide a tractor of simple construction adapted to be operated electrically and suitable for the purpose above set forth.

A further object is to provide improvements whereby wear and tear of the insulating of the cable supplying current to the tractor is reduced to a minimum.

A further object is to provide improved steering arrangement for such tractor.

A further object of my invention is to provide an auxiliary apparatus for use in combination with such tractor and by which the electric current can be supplied to the latter.

My invention has further for its object to provide further improvement which will be hereinafter set forth.

On the annexed sheet of drawings,

Figure 1 is a front elevation.

Figure 2 a plan view and

Figure 3 is an end elevation of the improved tractor, the views illustrated being more or less diagrammatic part of the band being omitted in Figures 2 and 3 and part of the end of the chassis being omitted in Figure 3.

Figure 4 illustrates diagrammatically a plan view of the tractor in combination with the auxiliary appliance above referred to.

Figure 5 is an elevation of said auxiliary apparatus a part of the tractor chassis being also shown.

Figures 6 and 7 illustrate a side elevation and section respectively of a portion of the band.

Fig. 8 is a sectional elevation taken on the line 8—8, Fig. 2.

Referring to the drawings—

Figure 1:
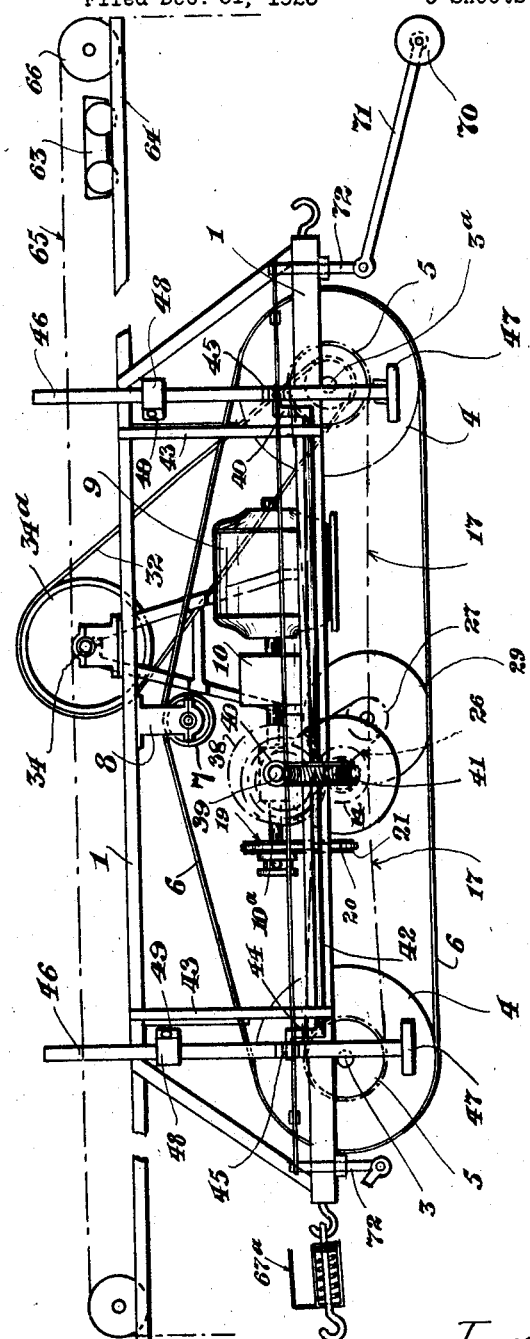

The chassis of the tractor comprises a longitudinal framework 1 of angle iron and to which is secured the substantially triangular framework 2.

Journalled in bearings carried by the chassis are the two axles 3, 3$^a$ on which are mounted the broad wheels 4, 4, and the sprocket wheels 5, 5. An endless band 6 passes over said wheels and also over the idle roller 7 which is journalled in bearings 8 secured to the framework.

Carried by the chassis is the motor 9 which drives through change gear box 10 a shaft 10$^a$, a worm 11 on said shaft and worm wheel 12, the shaft 13.

Loosely mounted on said shaft 13 are the two sprocket wheels 14, 14, and the pinion wheel 15, either of which can be clutched to the shaft by moving the dog clutch 16 into engagement therewith.

Driving chains 17, 17, pass over said sprocket wheels 14 and also the sprocket wheels 5 on the axles.

The shaft 10$^a$ has mounted thereon the variable pulley 19 over which passes a band 20 to the variable pulley 21. On the shaft of the latter is the bevel wheel 22 which meshes with a bevel wheel 23 on the shaft 24. On the latter is the sprocket wheel 25 which, by means of a chain 26, drives the sprocket wheel 27 mounted on the shaft 28 on which is also mounted the side ground or steering wheel 29. A dog clutch 19$^a$ is provided to clutch the pulley 21 to its shaft. On an extension of the shaft 3$^a$ is a pulley 30 which drives by means of a band 32 a pulley 33 mounted loosely on a shaft 34 on which is the tractor trail cable drum 34$^a$.

Pulley 33 has projections on one side which engage with a dog clutch 33$^a$ on shaft 34 as afterwards explained and thus drives shaft 34 and tractor drum 34$^a$.

The tractor trail cable 34$^b$, see Figures 4 and 5, is wound on said drum and is connected to slip rings 35 carried by the shaft 34 and from which rings the current is conducted to the motor while the other end thereof is connected to the slip rings 37 of the auxiliary apparatus which in turn is supplied by current from any suitable source by means of a cable 138 wound on the drum 139 of said apparatus.

Pinion 15 meshes with the toothed wheel 38 secured to the spindle 39 on which is the worm 40 in mesh with the worm wheel 41 keyed to the longitudinal shaft 42 supported by the brackets 43. Said shaft at its ends is provided with crank arms 44 and the crank pins engage with bearings 45 carried by the vertical rods 46 which at their lower ends carry feet 47. Said rods slide in boxes 48 which are pivoted to the arms 49 and constitute the point about which said rods rock as will be hereafter explained. The arms 49 are pivoted to the chassis at 50, and swing over notched quadrants 50$^a$ as desired by attendant.

Before describing the construction and operation of the auxiliary apparatus I will first set forth the operation of the tractor when ploughing a furrow.

Current is supplied through the cable 138, slip rings 37, cable 34$^b$ and slip rings 35, to which the end of the motor 9 is electrically connected, to the motor 9 which is thus set in operation.

Clutch 16 is moved to engage with and drive the sprocket wheels 14 which in turn through the chains 17, 17 drive the shafts 3 and 3$^a$ and therefore the endless band 6. The tractor is therefore moved over the ground in a longitudinal direction. Simultaneously the side wheel 29 is driven through the chain 26, bevel gearing 22, 23, belt 20 and variable pulleys 19 and 21. By varying the diameter of the pulley 21 the speed of rotation of the side wheel 29 can be varied and by this means the tractor can be moved to the left or right as may be desired and steering thereby effected.

At the end of a furrow it is necessary to move the whole tractor bodily in a transverse or lateral direction. This is accomplished by operating clutch 19$^a$ so that the variable pulley 19 is free on its shaft and operating clutch 16 so that sprocket wheels 14 are idle and pinion 15 driven. Said clutches may be interconnected to operate in unison by linkage of usual design. The pinion 15 therefore drives the toothed wheel 38, worm 40, worm wheel 41 and shaft 42. The cranks on the latter transmit their motion to the rods 46 causing same to descend and lift the tractor on its one side and by reason of the rods being pivoted at 48 moves the tractor to the side.

By lowering or raising the arms 46 over quadrants 50$^a$ the step or distance the tractor is moved transversely can be regulated to a greater or less extent as may be desired. Further by such adjustment the general fore and aft alignment of tractor can also be made parallel to the last furrow ploughed.

A wheel 51 located at the other side of the chassis and carried by a rod 53$^b$ pivoted at 52, is simultaneously brought into operation by means of the cable 53 connected at its one end to the said arm and to an eccentric, crank or the like 54 on the longitudinal shaft 42, thus lifting this side of tractor.

The wheel 51 then acts as a roller during transverse step of tractor after which it is again raised clear of the ground.

The helical spring 53$^a$ returns said roller to its normal position as shown in full lines.

After having been so moved the clutches 19$^a$ and 16 are again operated to drive the side wheel 29 and band 6.

The arrangement whereby the drum 34$^a$ is rotated will be hereafter described.

The said auxiliary apparatus and the manner in which it co-operates with the tractor will now be described.

The apparatus comprises a three wheeled carriage 55, the drum 139 rotatably mounted thereon, a cable support 56, and a wheel 57, which may be a rubber treaded vehicle wheel, also rotatably mounted on the carriage on a vertical axis which also passes through the drum 139.

The front or steering wheel 58 of the carriage is mounted on an axle carried by the upright 59 to which is secured a horizontally extending arm 60 which at its extremity carries rollers 61 and acts, as will be hereafter explained as a tiller arm to guide the carriage.

The triangular frame 2 of the chassis has attached thereto the inclined surfaces 60$^a$.

In operation the feeder cable 138 is laid across the centre of the field at right angles to the direction in which it is to be ploughed or otherwise cultivated, the one extremity of such cable being connected to the main power supply cable while the other end is wound round the drum 139 and connected to the slip rings 37.

The rollers 61 coact with said cable.

The carriage is placed so that the upper end of the support 56 carried thereby is in alignment with the drum 34$^a$ of the tractor and so that it will travel in the line of the feeder cable. The tractor trail cable is connected to the slip rings 37 and passes up said support and from there to the drum 34$^a$.

Each time the tractor passes the apparatus one of said inclined surfaces 60$^a$ co-acts with the wheel 57 thereby moving the carriage at right angles to the movement of the tractor. When the tractor passes the auxiliary apparatus in one direction the wheel 57 is partly rotated thereby serving to wind the feeder cable 38 on drum 39.

When passing in the other direction a pawl and ratchet arrangement, not shown, prevents the drum 139 being rotated so as to unwind the feeder cable, and allows wheel 57 to act as a roller on inclined surfaces 60$^a$ and thus thrust the auxiliary carriage in the required direction.

In like manner a whole field can be ploughed or otherwise cultivated, the carriage being automatically and intermittently moved so as to maintain the trail cable in substantial alignment with the drum of the tractor and the feeder cable automatically wound up until the field is ploughed.

During such movement the cable 138 serves to maintain the arm 60 in alignment therewith and thereby guides the carriage towards the main supply point.

The extent to which the feeder cable drum 139 is rotated each time the tractor passes the auxiliary apparatus and thereby co-acts with the wheel 57 depends on the amount of contact of the inclined surfaces 60$^a$ with the periphery of the wheel 57 and by adjusting the angle of inclination of such surfaces relative to the line of movement of the tractor this amount of operating contact can be varied.

As the tractor traverses backwards and forwards it is necessary that the drum 34ª should be rotated to unwind the cable 34ᵇ when the tractor is moving from the auxiliary apparatus and rotated to wind the cable thereon when being moved towards same.

And it is further necessary that the drum 34ª should be moved axially so as to maintain same in proper alignment with the cable 34ᵇ after the transverse movement of the tractor and the movement of the auxiliary apparatus.

This is accomplished as follows:—

Figure 2:
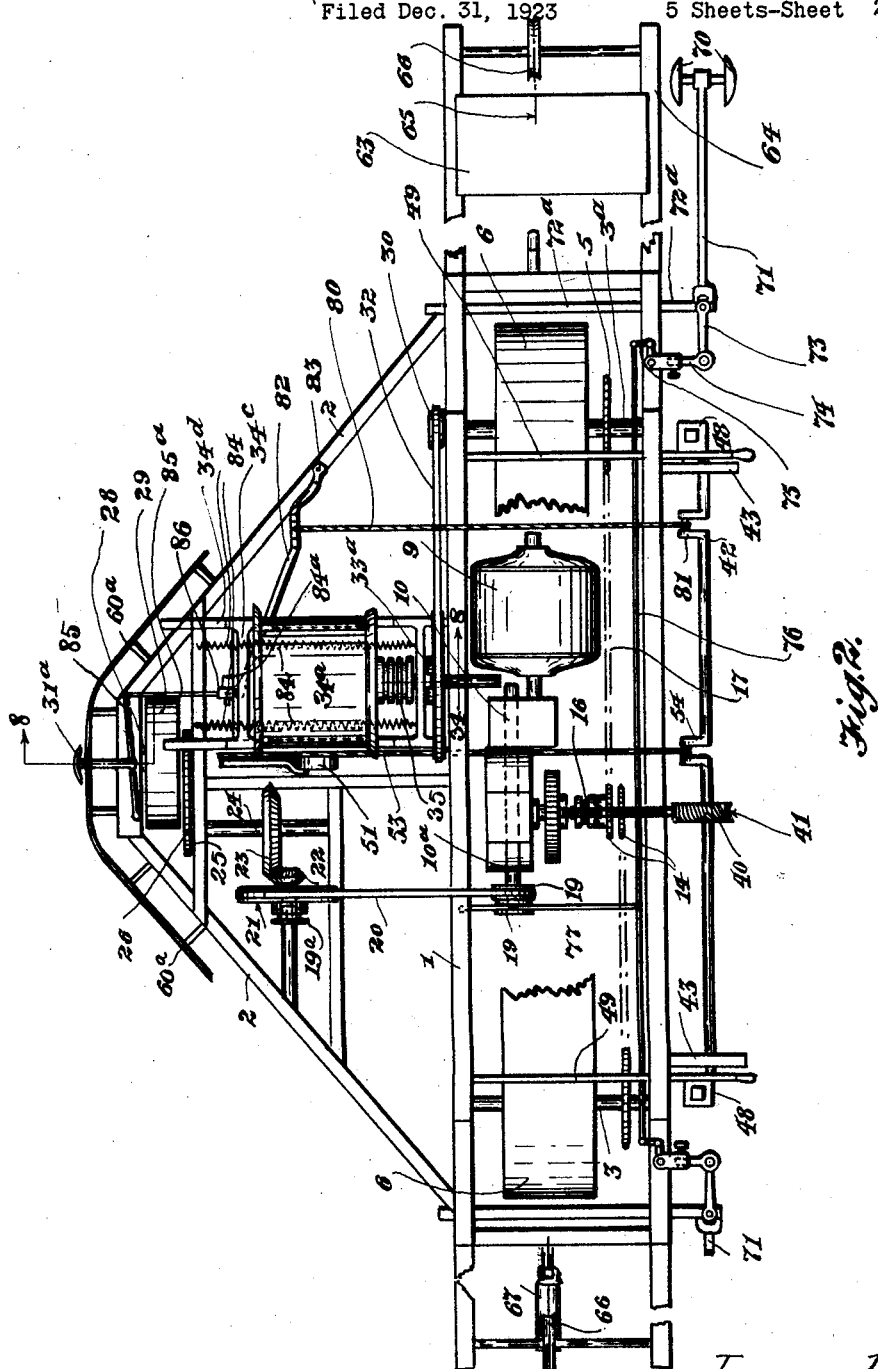

When clutch 16 is moved to drive the pinion 15 and shaft 42 a wire cable 80, which is secured at its one end to a crank 81 on said shaft, pulls a lever 82 pivoted to the frame 2 at 83 and to which lever the other end of the cable is secured. This lever at its other end is secured to a cross bar connecting the uprights 34ᶜ which support the drum 34ª and therefore operates to move said uprights over the transverse angle iron rails 34ᵈ thus displacing the drum carried thereby so that it occupies the position shown in Figure 2 in which position the dog clutch 33ª is driven by the pulley 33 and therefore drives the said drum.

During such movement of the uprights 34ᶜ the helical springs 84, which are secured to the uprights and to the frame, are put under tension.

A spring loaded bolt 84ª co-acts with the uprights and serves to prevent same moving backwards under the tension of the springs.

The drum 34ª remains in such position until the tractor passes the auxiliary apparatus which latter co-acts with the push rod 31ª and such rod, through lever 85, pushes inwards the rod 85ª the inner end of which carries a wedge or like member 86, which in turn co-acts with and depresses the bolt 84ª.

When the bolt is withdrawn the uprights 34ᶜ, carrying the drum 34ª is moved under the action of the springs 84 over the angle iron transverse rails 34ᵈ. This results in the drum 34ª being moved to bring same into alignment with the trailing tractor cable. Further by such movement the dog clutch 33ª is released from the pulley 33 thereby allowing the drum 34ª to rotate and play out the cable 34ᵇ as required.

When the tractor again comes to the end of its longitudinal movement and it is again moved transversely the flexible cable 80 again operates to displace the drum 34ª axially and also to bring the dog clutch 33ª into engagement with pulley 33 so that as the tractor moves towards the auxiliary apparatus the drum is rotated to wind on the cable 34ᵇ. In passing the auxiliary apparatus the push rod is again operated to free the bolt and permit of the displacement of the drum.

In like manner the drum is displaced each time the tractor is moved transversely and each time the auxiliary apparatus is moved, the clutch 33ª being simultaneously moved into and out of engagement.

By fixing the cable 80 to various points of the lever 82 the axial movement imparted to the drum can be varied.

Such tractor only travels in a backward and forward direction and steering may be automatically effected by means of a member travelling in a furrow and operatively connected to the said variable pulley 19 in such manner as to automatically correct any tendency of the tractor to deviate from its course.

In the arrangement shown the member comprises two discs 70 carried at the extremity of an arm 71 whose upper and forked end is connected to the short upright rod 72 carried by the horizontally extending rod 72ª. Said rod has rigidly secured thereto an arm 73 which in turn is connected by means of a telescopic arm 74 to the bell crank 75. The latter is connected to the longitudinally extending rod 76 which is connected to the pivoted rod 77 by which adjustment of the variable pulley 19 is effected.

By adjusting the rod 72ª and telescopic arm 74 the discs 70 can be adjusted to move within furrows at various distances from the chassis.

Should the tractor deviate from its course the said discs 70, which travel ahead of the tractor in a previously made furrow, impart a partial rotary movement to the rod 72 which in turn through the aforesaid mechanism operates to contract or expand the variable pulley 19 and thereby cause the wheel 29 to travel faster or slower as the case may be. Whenever the tractor resumes its normal course the variable pulley is returned to its normal position.

Such steering mechanism is duplicated at both ends of the tractor, one of same being raised out of the furrow when travelling in one direction and lowered to its operative position when travelling in the other direction.

It will be understood that hand control of the variable pulley and thereby the steering is also provided for.

To counteract any tendency of the tractor to tilt or rear when in operation a counterweight 63 is carried by an extension 64 of the frame 1, see Figure 1, and is located at the end opposite to that at which the plough or the like is attached.

Said counterweight is transferred to the other end of the frame when the travel of the tractor is reversed.

When used for ploughing a suitable plough may be secured to each end of the tractor and the free ends of the ploughs connected by a chain or cable 65 passing over drums 66 so that when raising or lowering a plough the one counterbalances the other, or if both ploughs remain in contact with the ground the forward plough will be guided by the said cable, regardless of the direction in which the tractor may be traveling.

The ploughs or the like are preferably attached to the tractor by means of a spring safety device 67 with a dash pot incorporated, so that the pull is taken through the spring.

In operation said spring is at normal compression but if an obstruction is encountered the spring is further compressed thereby allowing the plough or the like to fall an increased distance behind the tractor. In doing so a cable or the like 67ª operates to slow down the motor and finally bringing same to rest, or disengage a clutch in the transmission gear and thus stop the tractor.

Such device is shown at the right hand end of the tractor, Figure 1, but when the discs 70 are down this becomes the front end of the tractor and the plough or the like is fitted to such discs at the other or back end thereof.

The band 6 as shown in Figures 6 and 7 and which may be of rubber, balata or gutta percha and canvas or the like has secured at spaced distances apart by bolts or otherwise the cross bars 68, which are provided with grooves 69.

Wound round the belt so as to lie within said grooves is a steel wire or cable 70. Cross bars 70ª also provided with grooves are secured to the bars 68 so as to clamp the cable in position.

Projections 71 on the bars 70ᶜ serve to prevent the belt from slipping on the ground and the bent over ends 72 of the bars 68 serve to prevent the band slipping off the wheels.

It will be understood that where the ground is unsuitable for the employment of the band the wheels are provided with spurs or projections as in tractors at present in use.

What I claim is:—

1. A tractor comprising a chassis, wheels supporting same, a motor carried by the chassis and arranged to drive said wheels, a drum mounted on a horizontal axis and capable of axial displacement, means to move the tractor in a lateral direction, and means to displace said drum in an axial direction and arranged to act in unison with the lateral displacement of the tractor.

2. A tractor comprising a movable chassis, a driving motor for said chassis, a ground or steering wheel located at the side of the chassis or framework and driven from the motor, a variable gear interposed between the ground or steering wheel and motor, and a member adapted to travel in a furrow operatively connected to the variable gear to control automatically the steering of the tractor.

3. A tractor adapted to travel backward and forward in a substantially straight line comprising an electric motor, a drum mounted on a horizontal axis and around which a cable can be wound and current supplied thereby from a convenient source to said motor, means actuated by said motor for moving the tractor in a lateral direction, means actuated by the tractor lateral moving means for displacing said drum in an axial direction, means for rotating said drum to wind the cable thereon, and a clutch by which said drum can be released to rotate freely, to pay out said cable.

4. A tractor adapted to travel backward and forward in a substantially straight line comprising in combination an electric motor for driving the tractor, a drum for a cable permitting current to be supplied to said motor, spring means for moving the drum axially in one direction, a catch to hold the drum against the action of said spring, means for moving the tractor bodily in a lateral direction, and means to simultaneously move the drum axially against the action of the spring.

5. A tractor adapted to travel backward and forward in a substantially straight line comprising an electric motor arranged to drive the tractor, a shaft extending longitudinally of the tractor, gearing to rotate said shaft and driven by said motor, means operated by the shaft to lift one side of the tractor and to traverse the tractor in a transverse or lateral direction, a wheel normally clear of the ground, means operated by said shaft to cause the said wheel to raise the other side of the tractor when the latter is being traversed.

6. A tractor comprising a chassis or framework, wheels supporting same, an endless band passing over said wheels, an electric motor carried by the chassis or framework and arranged to drive said band, a drum carried by said chassis or framework and around which a cable can be wound and current supplied from a convenient source to said motor, a ground or steering wheel located at the side of the chassis or framework, a variable drive interposed between said ground or steering wheel and the motor and by which the rotation of the former can be varied to steer the tractor, upright rods at the one side of the tractor, means for imparting a circumferential movement to the lower ends thereof to move the tractor laterally, and a wheel to support the other side of the tractor when so moved.

7. A tractor arranged to travel backwards and forwards comprising in combination a carriage, a wheel carried thereby and arranged to co-act with the tractor, a drum for a feeder cable operatively connected to said wheel, and a support for the cable to convey current to the tractor.

8. A tractor comprising a carriage, a drum for a feeder cable carried thereby, a support for the tractor cable, slip rings to convey the current from the feeder cable to the tractor cable, and means arranged to co-act with the tractor to automatically and intermittently displace the carriage at right angles to the travel of the tractor and wind the feeder cable on its drum.

9. For a motor driven tractor arranged to travel backwards and forwards an auxiliary apparatus comprising a carriage, a drum for a feeder cable, a support for a cable to convey current to the tractor, means arranged to co-act with the tractor and displace the carriage intermittently at right angles to the travel of the tractor and wind the feeder cable on the drum, and means adapted to co-operate with said cable and automatically steer the carriage.

10. For a motor driven tractor arranged to travel backwards and forwards an auxiliary apparatus comprising in combination a carriage, a wheel carried thereby and arranged to co-act with the tractor, a drum for a feeder cable operatively connected to said wheel, a support for the cable to convey current to the tractor, a steering arm for said carriage and means carried by said arm and adapted to co-act with said feeder cable.

ANDREW McDOWALL.